US012603577B2

(12) United States Patent
Lee et al.

(10) Patent No.: US 12,603,577 B2
(45) Date of Patent: Apr. 14, 2026

(54) ASYMMETRIC HALF-BRIDGE FLYBACK POWER CONVERTER AND METHOD OF OPERATING THE SAME

(71) Applicant: CHICONY POWER TECHNOLOGY CO., LTD., New Taipei City (TW)

(72) Inventors: Min-Han Lee, New Taipei City (TW); Meng-Yuan Tsai, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 227 days.

(21) Appl. No.: 18/652,090

(22) Filed: May 1, 2024

(65) Prior Publication Data

US 2025/0286464 A1 Sep. 11, 2025

(30) Foreign Application Priority Data

Mar. 11, 2024 (TW) ................................. 113108823

(51) Int. Cl.
*H02M 3/335* (2006.01)
*H02M 1/00* (2006.01)
*H02M 3/00* (2006.01)

(52) U.S. Cl.
CPC ....... *H02M 3/3353* (2013.01); *H02M 1/0058* (2021.05); *H02M 3/01* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569;

H02M 3/33507; H02M 2007/4815; H02M 2007/4818; H02M 1/083; H02M 3/33538; H02M 3/33546; H02M 3/33515;
(Continued)

(56) References Cited

U.S. PATENT DOCUMENTS 7,548,435 B2 6/2009 Mao
12,009,753 B2 * 6/2024 Yang ................. H02M 3/33571
(Continued)

FOREIGN PATENT DOCUMENTS

CN 113346753 A 9/2021
CN 112290789 B 6/2022
(Continued)

OTHER PUBLICATIONS

Office Action dated Nov. 8, 2024 of the corresponding Taiwan patent application No. 113108823.

*Primary Examiner* — Jeffrey A Gblende
(74) *Attorney, Agent, or Firm* — Muncy, Geissler, Olds & Lowe, P.C.

(57) ABSTRACT

An asymmetric half-bridge flyback power converter includes a transformer, a resonant circuit, a first switch, a second switch, a discharging switch, an energy storage capacitor, and a controller. The first switch and the second switch are connected in series at a node, and the resonant circuit is coupled between the node and the transformer. The discharging switch is coupled between the node and the energy storage capacitor. When the power converter operates in a discontinuous resonant mode, and before the first switch is turned on by the controller, the discharging switch is first turned on so that the energy storage capacitor stores energy to rise a current flowing to the node.

16 Claims, 11 Drawing Sheets

(58) Field of Classification Search

CPC ......... H02M 3/33576; H02M 3/33592; H02M
3/33553; H02M 3/33523; H02M 3/33561;
H02M 3/155; H02M 3/1582; H02M
1/4233; H02M 1/12; H02M 3/07; H02M
7/219; H02M 7/4815; H02M 1/0048;
H02M 7/4818; H02M 7/4826; H02M
7/4833; H02M 3/33573; Y02B 70/1491

See application file for complete search history.

(56) References Cited

U.S. PATENT DOCUMENTS

| | | | |
|---|---|---|---|
| 2018/0241299 A1* | 8/2018 | Jitaru | ................. H02M 3/33592 |
| 2018/0301974 A1* | 10/2018 | Lin | ......................... H02M 1/38 |
| 2020/0321876 A1 | 10/2020 | Mao | |
| 2023/0261580 A1 | 8/2023 | Chiu et al. | |
| 2024/0120831 A1* | 4/2024 | Jiang | ................. H02M 3/33592 |

FOREIGN PATENT DOCUMENTS

| | | | |
|---|---|---|---|
| CN | 115800762 A | 3/2023 | |
| CN | 115940660 B | 6/2023 | |
| CN | 116317593 A | 6/2023 | |
| TW | 200529544 A | 9/2005 | |
| TW | I313098 B | 8/2009 | |
| TW | 201304380 A | 1/2013 | |
| TW | 201735518 A | 10/2017 | |
| TW | M569967 U | 11/2018 | |
| TW | 202308282 A | 2/2023 | |
| TW | 202308283 A | 2/2023 | |
| TW | M637302 U | 2/2023 | |
| TW | 202312644 A | 3/2023 | |

* cited by examiner

ASYMMETRIC HALF-BRIDGE FLYBACK POWER CONVERTER AND METHOD OF OPERATING THE SAME

BACKGROUND

Technical Field

The present disclosure relates to a power converter and a method of operating the same, and more particularly to an asymmetric half-bridge flyback power converter and a method of operating the same.

Description of Related Art

The statements in this section merely provide background information related to the present disclosure and do not necessarily constitute prior art.

In recent years, as consumer electronics products have gradually increased their requirements for adapter power and size, switching power converters have the characteristics of high efficiency and small size, which have replaced linear voltage regulators and become the mainstream of consumer electronics products. An asymmetric half-bridge flyback power converter has the advantage of low input current ripple, and its built-in current ripple elimination mechanism is used to further effectively reduce the input current ripple. Therefore, the asymmetric half-bridge flyback power converter has become a more suitable circuit structure for switching power converters.

Traditional asymmetric half-bridge flyback power converters usually use metal oxide semiconductors (MOSFETs) as switching components for a pulse width modulation (PWM). The reason is that the MOSFET has the characteristics of fast switching speed and low loss. However, if the parasitic capacitance of the MOSFET is not fully discharged when the switch is turned on, there will be a cross voltage across a drain to a source of the MOSFET. This cross voltage will cause a loss with the current flowing through the source of the MOSFET, which is called the switching loss of the MOSFET. Since in the technical field of power converters, the requirements for high efficiency in their operation are getting higher and higher, it is necessary to reduce the switching losses of MOSFETs as much as possible.

Therefore, how to design an asymmetric half-bridge flyback power converter and a method of operating the same to achieve zero-voltage switching at any time point in the power conversion process to reduce MOSFET switching losses has become a critical topic in this field.

SUMMARY

In order to solve the above-mentioned problems, the present disclosure provides an asymmetric half-bridge flyback power converter. The asymmetric half-bridge flyback power converter includes a transformer, a resonant circuit, a switching circuit, a zero-voltage switching circuit, and a controller. The transformer includes a primary-side winding, a secondary-side winding, and a magnetizing inductance. The primary-side winding is coupled to the secondary-side winding, and the magnetizing inductance is connected to the primary-side winding in parallel. The resonant circuit is coupled to the primary-side winding. The switching circuit includes a first switch and a second switch connected in series at a node, and the node is coupled to the resonant circuit. The zero-voltage switching circuit is coupled to the node, and includes a discharging switch, a diode, and an energy storage capacitor connected in series. The controller is coupled to the zero-voltage switching circuit, and the controller controls the first switch and the second switch to be turned on or turned off to generate an output voltage. When an output energy of the power converter is less than an energy threshold and before the first switch is turned on by the controller, the controller first turns on the discharging switch so that the energy storage capacitor stores energy to rise a current flowing to the node.

In one embodiment, when the output energy is the output voltage and the output voltage is less than a voltage threshold, the controller first turns on the discharging switch before the first switch is turned on by the controller. When the output energy is an output current of the power converter and the output current is less than a first current threshold, the controller first turns on the discharging switch before the first switch is turned on by the controller.

In one embodiment, the asymmetric half-bridge flyback power converter further includes an auxiliary winding and a voltage regulation circuit. The auxiliary winding is coupled to the primary-side winding. The voltage regulation circuit is coupled to the auxiliary winding. The auxiliary winding is coupled to the primary-side winding to generate a winding voltage, and the voltage regulation circuit supplies power to the controller according to the winding voltage.

In one embodiment, the energy storage capacitor is connected to the voltage regulation circuit in parallel, and the energy storage capacitor stores a working voltage provided by the voltage regulation circuit, and the controller receives the working voltage to operate.

In one embodiment, the first switch comprises a first parasitic capacitance, and a capacitance value of the first parasitic capacitance is less than an energy storage capacitance value of the energy storage capacitor.

In one embodiment, when the first switch is turned on and the second switch is turned off, the magnetizing inductance stores energy of a magnetizing current. When a current value of the magnetizing current is greater than or equal to a current threshold, the controller turns off the first switch so that a second parasitic capacitance of the second switch discharges toward the node.

In one embodiment, when the first switch is turned off and the second switch is turned on, the energy of the primary-side winding is transferred to the secondary-side winding and the auxiliary winding. When the first switch and the second switch are turned off and the magnetizing current releases energy to zero, the magnetizing inductance, the first parasitic capacitance, and the second parasitic capacitance generate a resonance with a resonant period.

In one embodiment, the resonant period is related to a magnitude of an output current of the power converter.

In one embodiment, the resonant circuit includes a resonant capacitor. When the discharging switch is turned on, the resonant capacitor charges the second parasitic capacitance, the energy storage capacitor, and the magnetizing inductance.

In one embodiment, when the current rises to a second current threshold, the controller turns off the discharging switch, and the second current threshold is related to a time when the first parasitic capacitance is completely discharged.

In order to solve the above-mentioned problems, the present disclosure provides a method of operating an asymmetric half-bridge flyback power converter. The power converter includes a transformer, a resonant circuit, a first switch, a second switch, a discharging switch, and an energy storage capacitor. The first switch and the second switch are connected in series at a node, and the resonant circuit is coupled between the node and the transformer. The discharging switch is coupled between the node and the energy storage capacitor. The method includes steps of: controlling the first switch and the second switch to be turned on or turned off according to a feedback signal to generate an output voltage; determining whether an output energy of the power converter is less than an energy threshold; first turning on the discharging switch when the output energy is less than the energy threshold and before the first switch is controlled to be turned on.

In one embodiment, when the output energy is the output voltage, the method further includes steps of: determining whether the output voltage is less than a voltage threshold; first turning on the discharging switch when the output voltage is less than the voltage threshold and before the first switch is controlled to be turned on.

In one embodiment, when the output energy is an output current of the power converter, the method further includes steps of: determining whether the output current is less than a first current threshold; first turning on the discharging switch when the output current is less than the first current threshold and before the first switch is controlled to be turned on.

In one embodiment, the method further includes steps of: storing energy of a magnetizing current of the transformer when the first switch is turned on and the second switch is turned off; turning off the first switch when a current value of the magnetizing current is greater than or equal to a current threshold; discharging a second parasitic capacitance of the second switch toward the node.

In one embodiment, the method further includes steps of: transferring the energy of the transformer to a secondary-side winding and an auxiliary winding of the power converter; generating a resonance with a resonant period by the magnetizing inductance, a first parasitic capacitance of the first switch, and the second parasitic capacitance of the second switch when the first switch and the second switch are turned off and the magnetizing current releases energy to zero. The resonant period is related to a magnitude of an output current of the power converter.

In one embodiment, the method further includes steps of: charging the second parasitic capacitance, the energy storage capacitor, and the magnetizing inductance by a resonant capacitor of the resonant circuit; turning off the discharging switch when the current rises to a second current threshold. The second current threshold is related to a time when the first parasitic capacitance is completely discharged.

Therefore, the main purpose and effect of the present disclosure is to enable zero-voltage switching in the discontinuous resonant mode. The method is to connect a discharging switch and a diode in series at the node between the first switch and the second switch. Before the first switch is turned on, the discharging switch is turned on, and the resonant circuit is used to reversely charge the magnetizing inductance to increase the reverse current flowing into the node between the first switch and the second switch. Therefore, this reverse current can be used to discharge the parasitic capacitance of the first switch to achieve the effect of zero-voltage switching.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
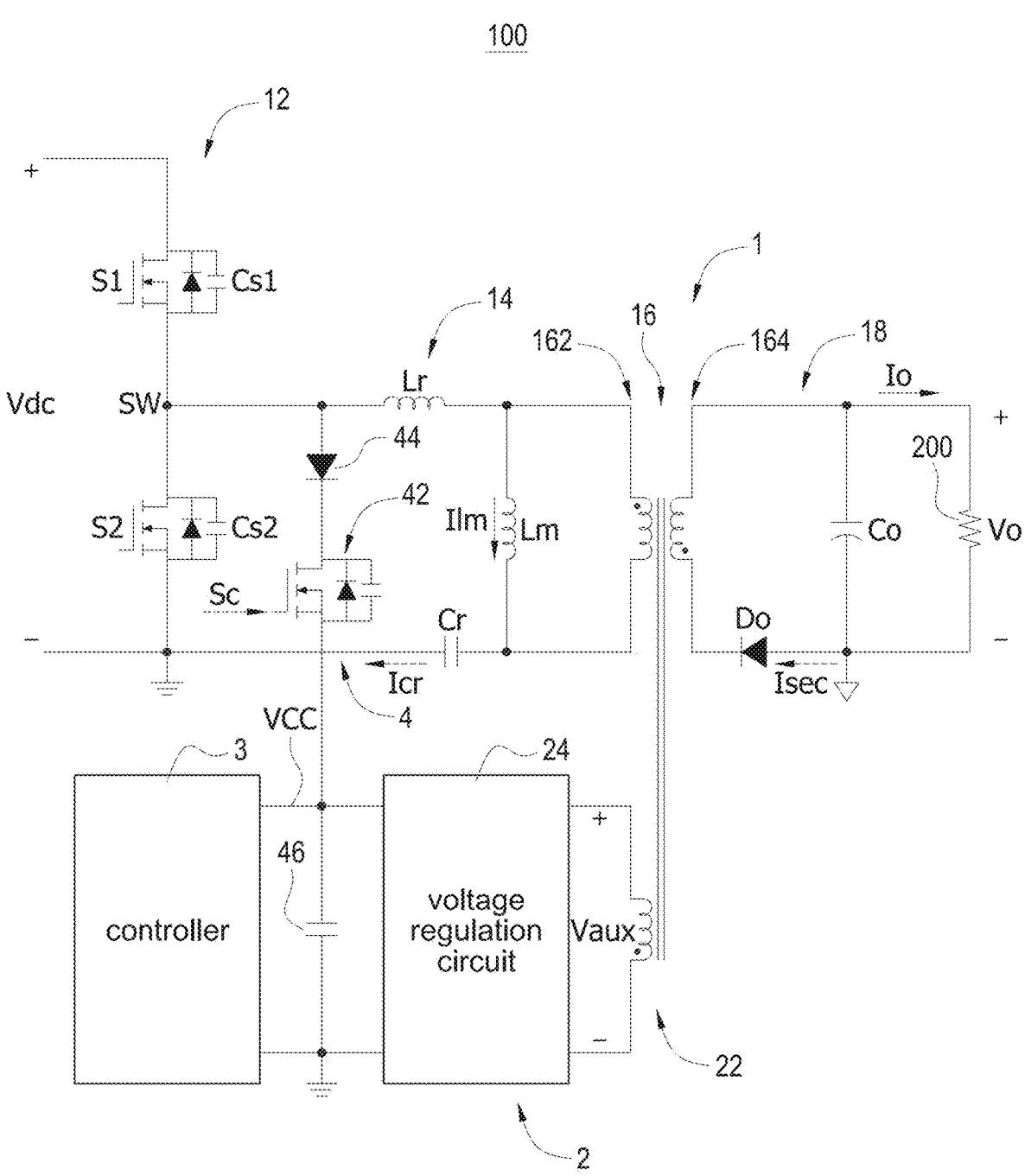
FIG. 1A is a block circuit diagram of an asymmetric half-bridge flyback power converter according to the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a block circuit diagram of an asymmetric half-bridge flyback power converter according to the present disclosure. The asymmetric half-bridge flyback power converter 100 (hereinafter abbreviated as "power converter 100") receives a direct-current (DC) voltage Vdc, and converters the DC voltage Vdc into an output voltage Vo to supply power to a load 200 coupled to a rear end. The power converter 100 includes a power conversion circuit 1, an auxiliary power supplying circuit 2, a controller 3, and a zero-voltage switching circuit 4. The power conversion circuit 1 includes a switch circuit 12, a resonant circuit 14, a transformer 16, and a rectification circuit 18. In particular, there are various implementations of the rectification circuit 18, and here the rectification circuit 18 includes an output capacitor Co and an output diode Do as an example. The switch circuit 12 receives the DC voltage Vdc, and the switch circuit 12 includes a first switch S1 and a second switch S2 connected in series. The transformer 16 includes a primary-side winding 162, a secondary-side winding 164, and a magnetizing inductance Lm. The primary-side winding 162 is coupled to the secondary-side winding 164, and the magnetizing inductance Lm is connected to the primary-side winding 162 in parallel. In particular, the magnetizing inductance Lm may be an equivalent inductance formed by the primary-side winding 162, or an additional winding wound by the transformer 16.

One terminal of the resonant circuit 14 is coupled to a node SW between the first switch S1 and the second switch S2, and the other terminal of the resonant circuit 14 is coupled to the primary-side winding 162. In one embodiment, the resonant circuit 14 may include a resonant inductor Lr and a resonant capacitor Cr. One terminal of the resonant inductor Lr is coupled to the node SW between the first switch S1 and the second switch S2, and the other terminal of the resonant inductor Lr is coupled to one terminal of the primary-side winding 162. One terminal of the resonant capacitor Cr is coupled to the second switch S2 and a ground terminal, and the other terminal of the resonant capacitor Cr is coupled to the other terminal of the primary-side winding 162. In one embodiment, it is not limited to the structure of the resonant circuit 14 mentioned above, that is, any circuit structure that can enable the resonant circuit 14 to produce a resonant function should be included in the scope of this embodiment. One terminal of the rectification circuit 18 is coupled to the secondary-side winding 164, and the other terminal of the rectification circuit 18 is coupled to the load 200 to provide the output voltage Vo to supply power to the load 200.

The auxiliary power supplying circuit 2 includes an auxiliary winding 22 and a voltage regulation circuit 24, and the auxiliary winding 22 is coupled to the primary-side winding 162. One terminal of the voltage regulation circuit 24 is coupled to the auxiliary winding 22, and the other terminal of the voltage regulation circuit 24 is coupled to the controller 3. The auxiliary winding 22 generates a winding voltage Vaux by coupling the primary-side winding 162, and the voltage regulation circuit 24 supplies power to the controller 3 according to a working voltage VCC provided by the winding voltage Vaux. The zero-voltage switching circuit 4 is coupled to the node SW between the first switch S1 and the second switch S2, and the zero-voltage switching circuit 4 includes a discharging switch 42, a diode 44, and an energy storage capacitor 46 connected in series. The controller 3 is coupled to the first switch S1 and the second switch S2, and provides a pulse-width modulation (PWM) signal to control turning on or turning off the first switch S1 and the second switch S2 so as to control the power conversion circuit 1 to convert the DC voltage Vdc into the output voltage Vo. Moreover, the controller 3 receives a feedback signal corresponding to the output voltage Vo, and adjusts the PWM signal according to the feedback signal so as to stabilize/regulate a voltage value of the output voltage Vo by adjusting the PWM signal. The output capacitor Co stores the output voltage Vo to provide the output voltage Vo to supply power to the load 200. In one embodiment, the voltage regulation circuit 24 may be, for example, but not limited to, a circuit that can stabilize/regulate the winding voltage Vaux, such as a low drop-out linear regulator (LDO) or a clamping circuit. For example, the simplest implementation of the voltage regulation circuit 24 can be a diode, used to reverse bias and cut off a negative voltage of the winding voltage Vaux.

On the other hand, the controller 3 is coupled to the discharging switch 42. When an output energy of the power converter 100 is less than an energy threshold, and before the first switch S1 is turned on by the controller 3, the controller 3 first provides a control signal Sc to turn on the discharging switch 42 so that the energy storage capacitor 46 stores energy to rise a current flowing to the node SW. In particular, the energy storage capacitor 46 may be a capacitor with a larger capacitance value, and an electrolytic capacitor is a preferred implementation. Specifically, the energy storage capacitor 46 is mainly used to rise the current flowing to the node SW through energy storage, and therefore its capacitance value needs to be larger to provide better energy storage means. In one embodiment, the controller 3 may be, for example but not limited to, a control chip such as a microcontroller (MCU) or a digital signal processor (DSP). However, the controller 3 is not excluded and may also be implemented by a control circuit, a logic circuit, and other devices.

On the other hand, since the energy storage capacitor 46 is preferably an electrolytic capacitor, a capacitor with a larger capacitance value in the power converter 100 can be used as the energy storage capacitor 46. For example, but not limited to, the input capacitor, the output capacitor, the capacitor of the power supply terminal of the controller 3, etc., and this embodiment uses the energy storage capacitor 46 coupled to the power supply terminal of the controller 3 as an illustrative example to save additional capacitor configuration costs and increase the power density of the power converter 100. However, it does not rule out that the energy storage capacitor 46 is configured independently. In one embodiment, since the energy storage capacitor 46 is coupled to the power supply terminal of the controller 3, the energy storage capacitor 46 is connected in parallel to the voltage regulation circuit 24 to store the working voltage VCC provided by the voltage regulation circuit 24, and the controller 3 receives the working voltage VCC to operate.

Figure 1B:
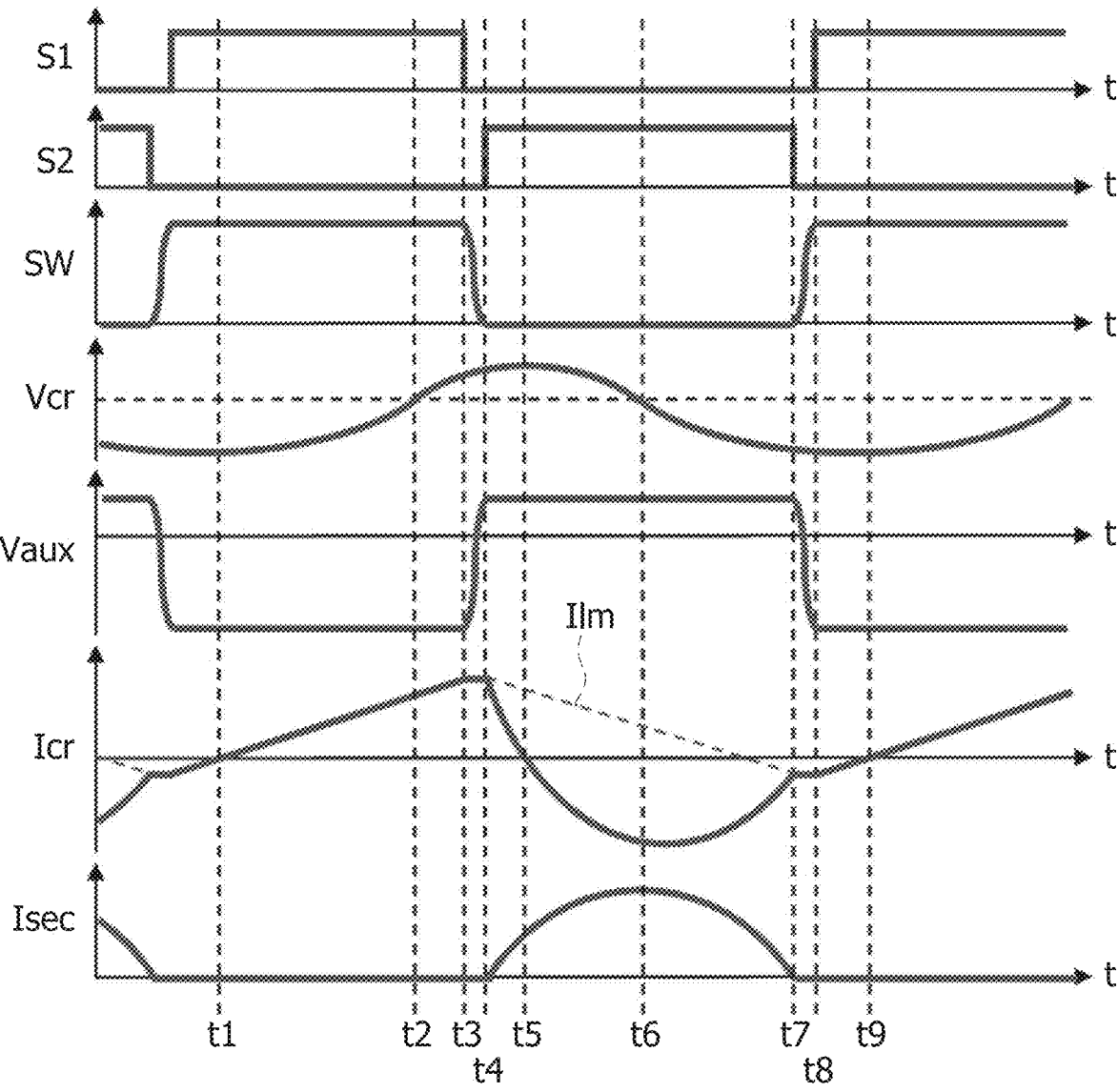
FIG. 1B is a timing waveform diagram of operating the asymmetric half-bridge flyback power converter in a continuous resonant mode according to the present disclosure.

Please refer to FIG. 1B, which shows a timing waveform diagram of operating the asymmetric half-bridge flyback power converter in a continuous resonant mode according to the present disclosure, and also refer to FIG. 1A. When the power converter 100 operates in a continuous resonant mode and the first switch S1 is turned on, the DC voltage Vdc charges the magnetizing inductance Lm of the transformer 16 and the resonant capacitor Cr of the resonant circuit 14. Therefore, a magnetizing current Ilm flowing through the magnetizing inductance Lm and a resonant current Icr flowing through the resonant capacitor Cr gradually increase. When the second switch S2 is turned on, energy is transferred from the resonant capacitor Cr on the primary side of the transformer 16 to the secondary side of the transformer 16, and the waveform of a secondary-side current Isec is like the half-sine wave current waveform of the resonant converter. Due to changes in the output wide voltage and output current Io (herein collectively referred to as output energy), the turned-on time of the first switch S1 will be affected. Since under this operation, the magnetizing inductance Lm will be clamped at nVo (that is, n times the output voltage Vo) to perform flux leakage, and when the output energy changes, the flux leakage time will change.

In general, since the switching component is not an ideal component, the first switch S1 includes a first parasitic capacitance Cs1, and the second switch S2 includes a second parasitic capacitance Cs2. When the power converter 100 operates in the continuous resonant mode, the power converter 100 usually continues to turn on the second switch S2 to reversely charge the magnetizing inductance Lm after the magnetizing inductance Lm is discharged to 0 A so that the excitation current Ilm reverse (that is, the direction of the current is the direction flowing to the node SW) so that the magnetizing current Ilm is reversed (that is, the current flows toward the node SW). Afterward, this reverse current is used to discharge the first parasitic capacitance Cs1 of the first switch S1 to achieve the effect of zero voltage switching. This continuous resonant mode, although used at full load and high voltage, can achieve zero voltage switching.

However, when the output current Io or the output voltage Vo (i.e., the output energy) decreases, the current peak value of the magnetizing current Ilm of the magnetizing inductance Lm also decreases, thereby causing the operating frequency of the power converter 100 to be too high. Also, the circulating energy of the resonant circuit 14 will also limit the overall efficiency of the power converter 100. Therefore, in the case of low output energy, the asymmetric half-bridge flyback power converter 100 usually operates in the discontinuous resonant mode of the magnetizing current Ilm (that is, the controller 3 adjusts the operation mode to the discontinuous resonant mode). However, if the second switch S2 in the discontinuous resonant mode is turned off when the magnetizing inductance Lm discharges to 0 A, there will not be enough reverse magnetizing current Ilm in the discontinuous resonant mode, and zero voltage switching may not be achieved, thereby resulting in additional switching losses.

Therefore, the main purpose and effect of the present disclosure is to enable zero-voltage switching in the discontinuous resonant mode. The method is to connect a discharging switch 42 and a diode 44 in series at the node SW between the first switch S1 and the second switch S2. Before the first switch S1 is turned on, the discharging switch 42 is turned on, and the resonant circuit 14 is used to reversely charge the magnetizing inductance to increase the reverse current flowing into the node SW between the first switch S1 and the second switch S2. Therefore, this reverse current can be used to discharge the parasitic capacitance of the first switch S1 to achieve the effect of zero-voltage switching.

Furthermore, since under the condition of low output energy, the asymmetric half-bridge flyback power converter 100 will operate in the discontinuous resonant mode of the magnetizing current Ilm, the resonant circuit 14 must be used to reversely charge the magnetizing inductance to increase the reverse current flowing into the node SW between the first switch S1 and the second switch S2. Therefore, the controller 3 must detect the level of output energy. In particular, the output energy may be the output voltage Vo. When the output energy is the output voltage Vo, and the output voltage Vo is less than the voltage threshold (for example, but not limited to, the output voltage Vo with a wide-range upper limit of 48V, the voltage threshold may be set at 12V). Before the first switch S1 is turned on by the controller, the controller 3 first turns on the discharging switch 42 to use the resonant circuit 14 to reversely charge the magnetizing inductance to increase the current flowing into the node SW in the reverse direction. On the other hand, the output energy may be the output current Io. When the output energy is the output current Io and the output current Io is less than a first current threshold (for example, but not limited to, for a fully loaded output current Io of 20A, and the first current threshold may be set to 5 A), before the first switch S1 is turned on by the controller 3, the controller first turns on the discharging switch 42 to use the resonant circuit 14 to reversely charge the magnetizing inductance to increase the current flowing into the node SW in the reverse direction.

Figure 2:
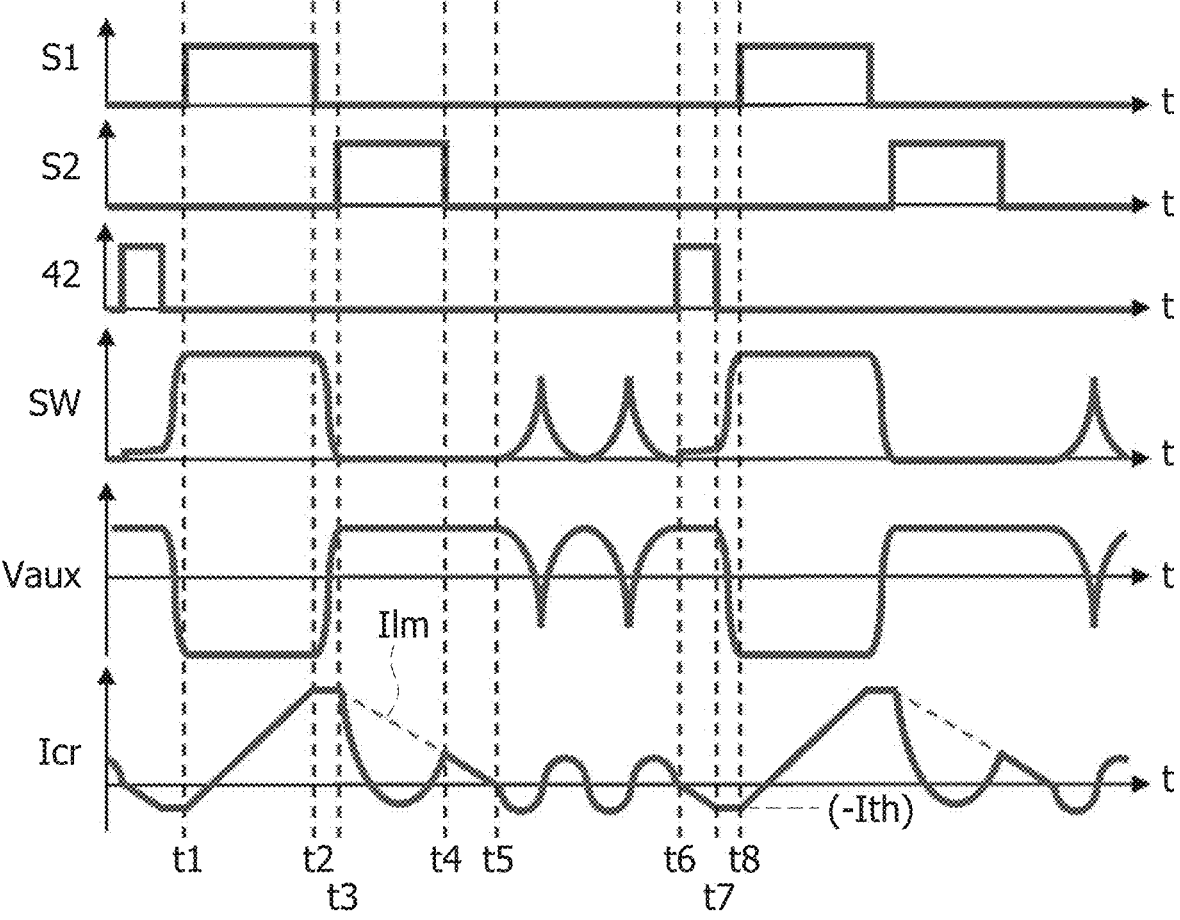
FIG. 2 is a timing waveform diagram of operating the asymmetric half-bridge flyback power converter in a discontinuous resonant mode according to the present disclosure.
Figure 3A:
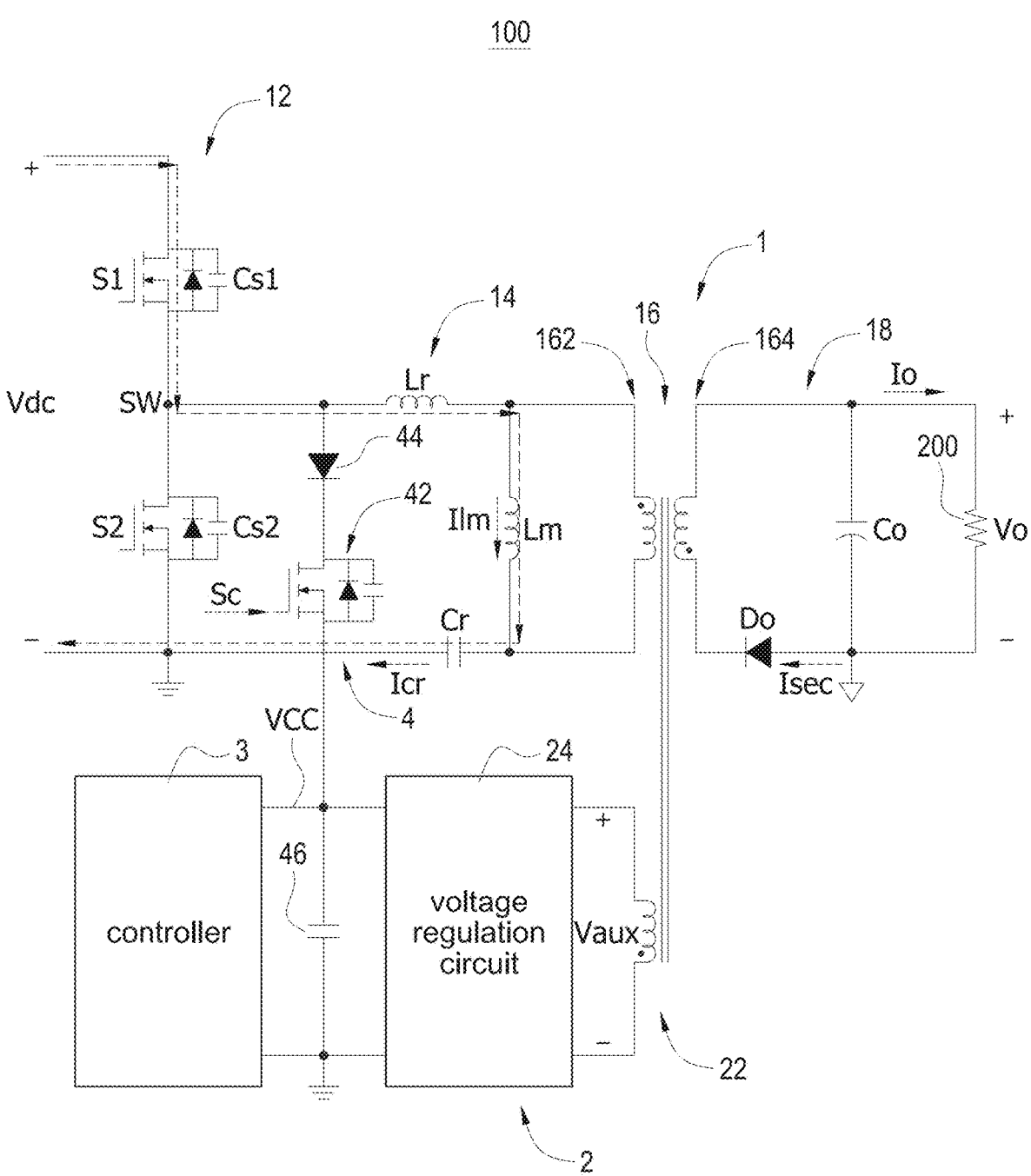
FIG. 3A to FIG. 3G are respectively current path diagrams of operating the asymmetric half-bridge flyback power converter in the discontinuous resonant mode according to the present disclosure.
Figure 3B:
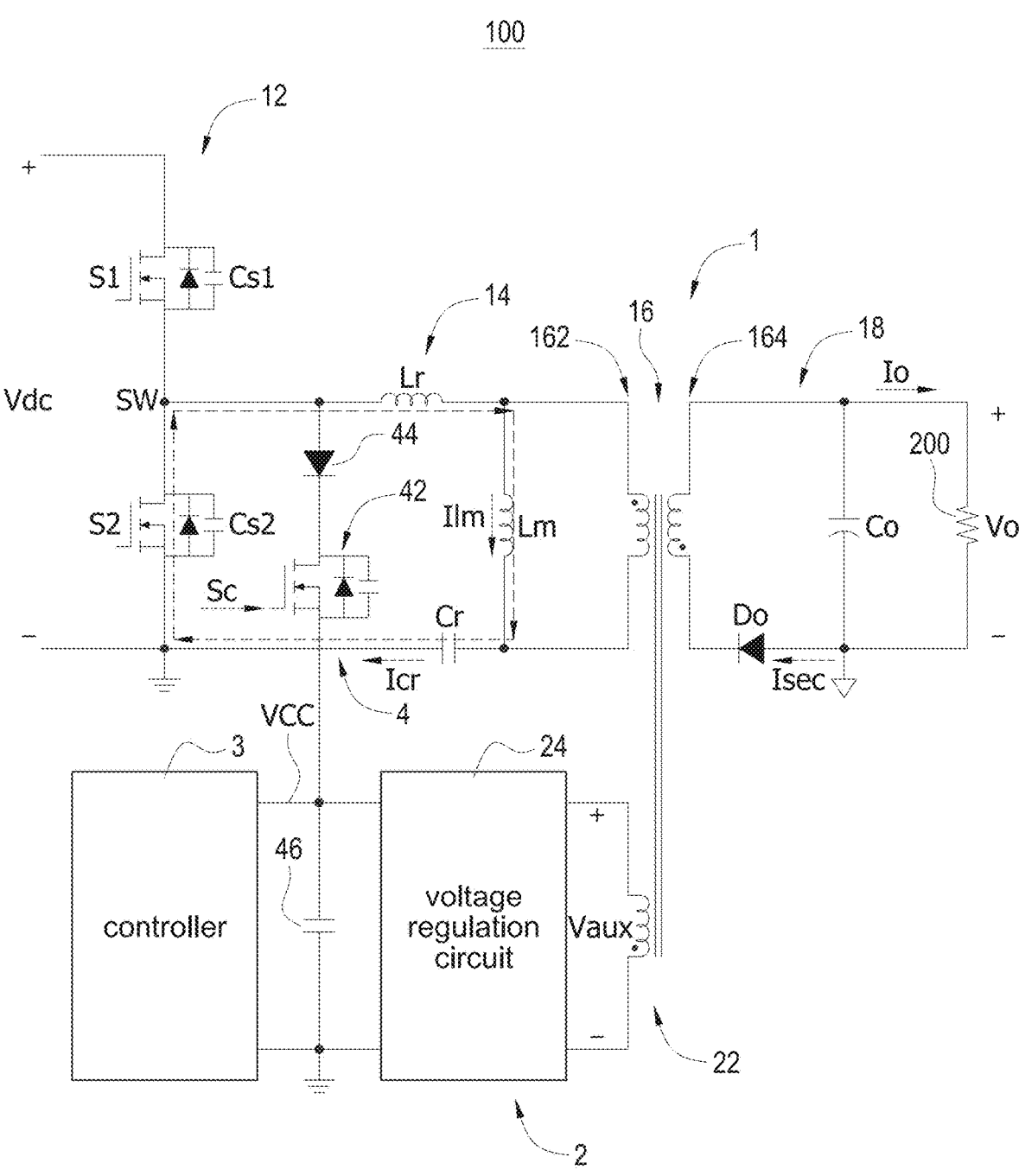
Figure 3C:
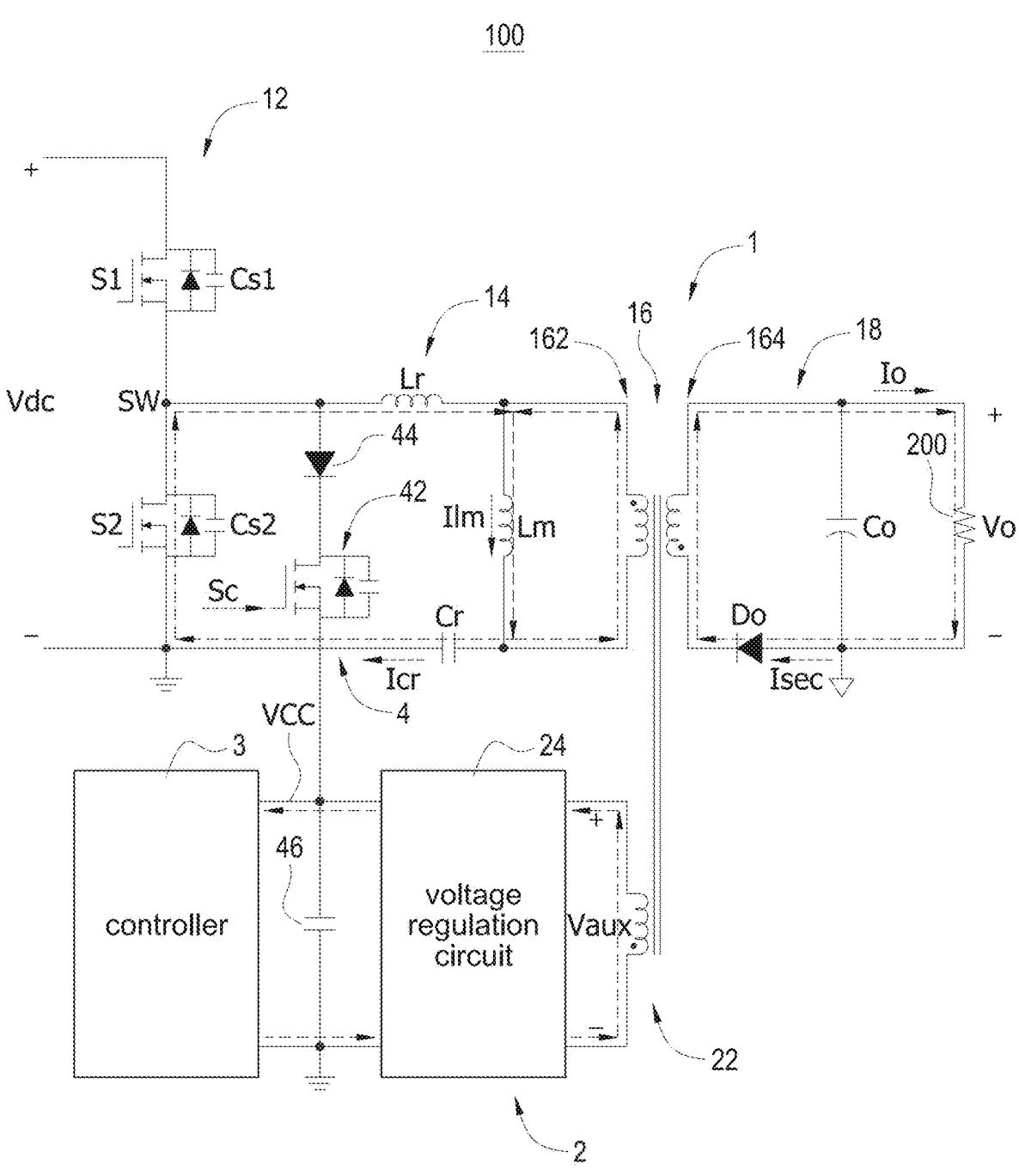
Figure 3D:
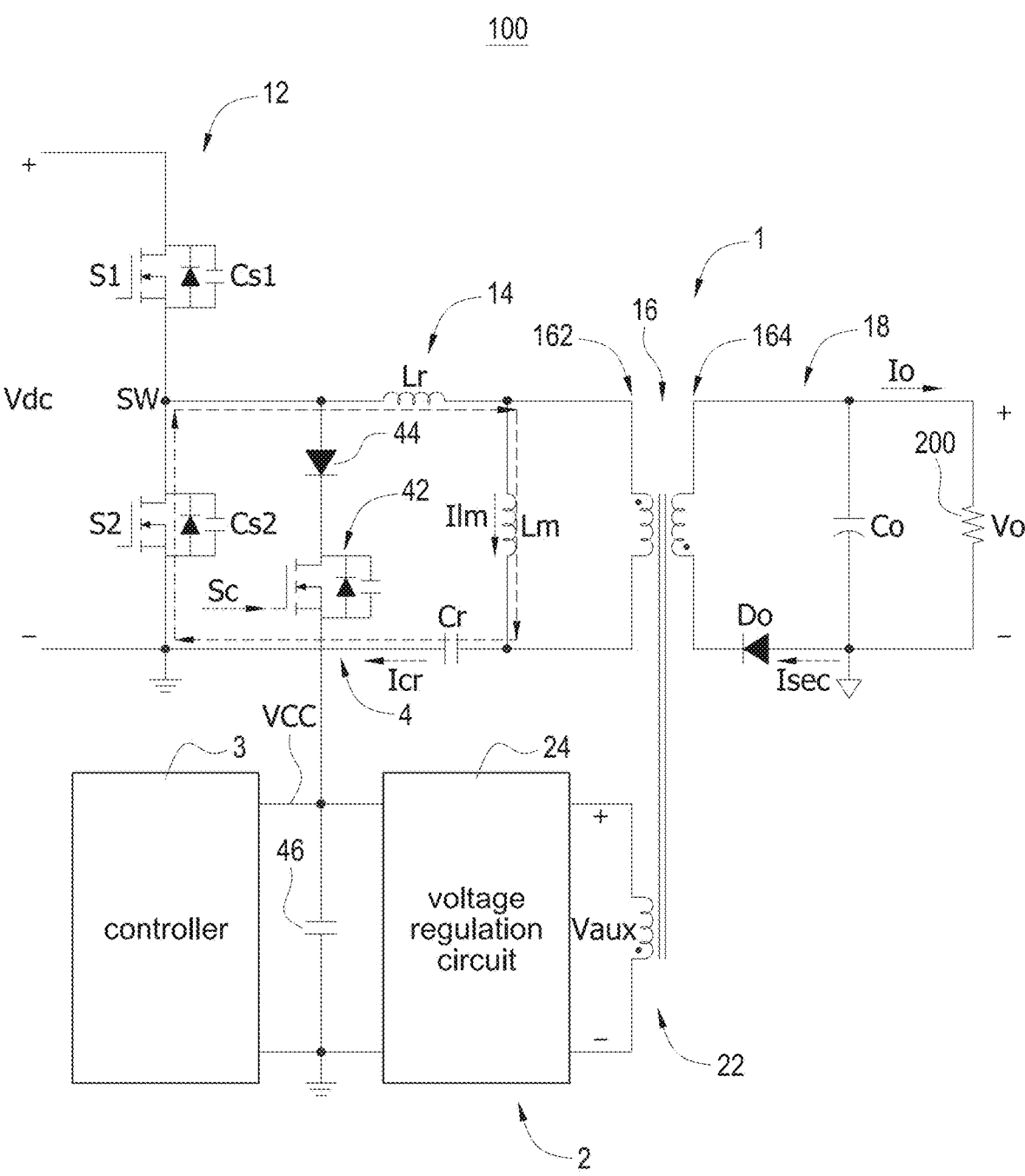
Figure 3E:
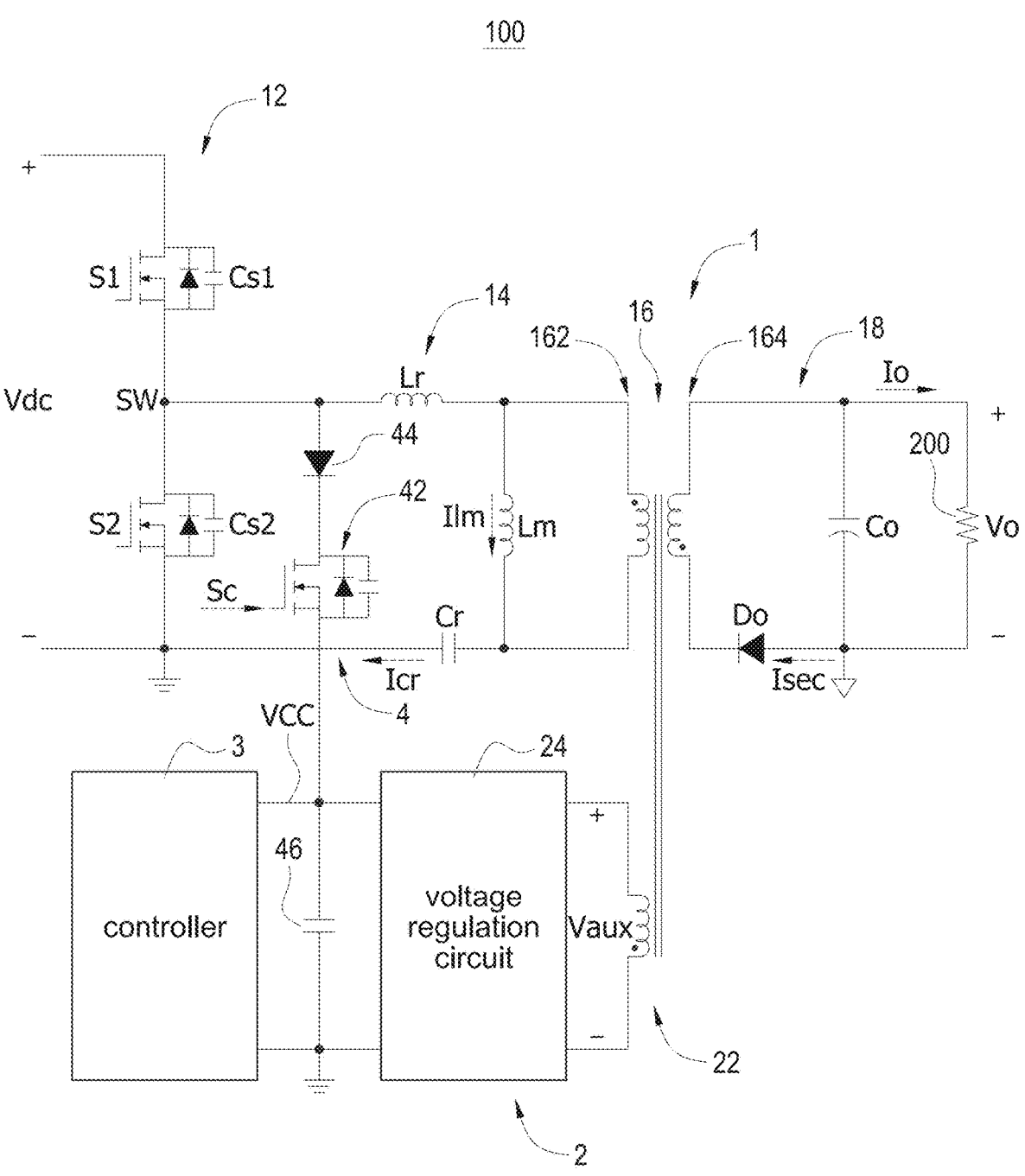
Figure 3F:
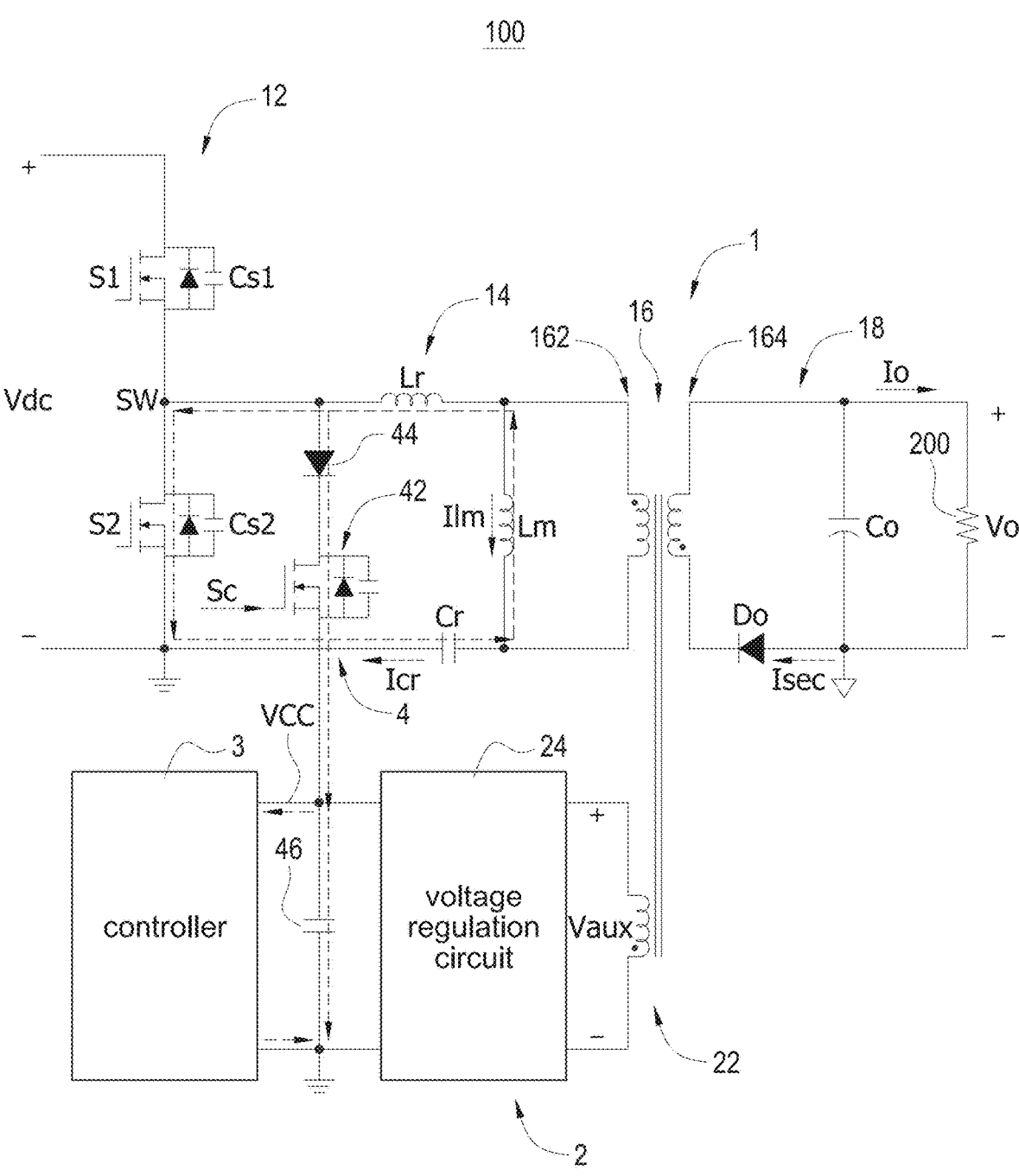
Figure 3G:
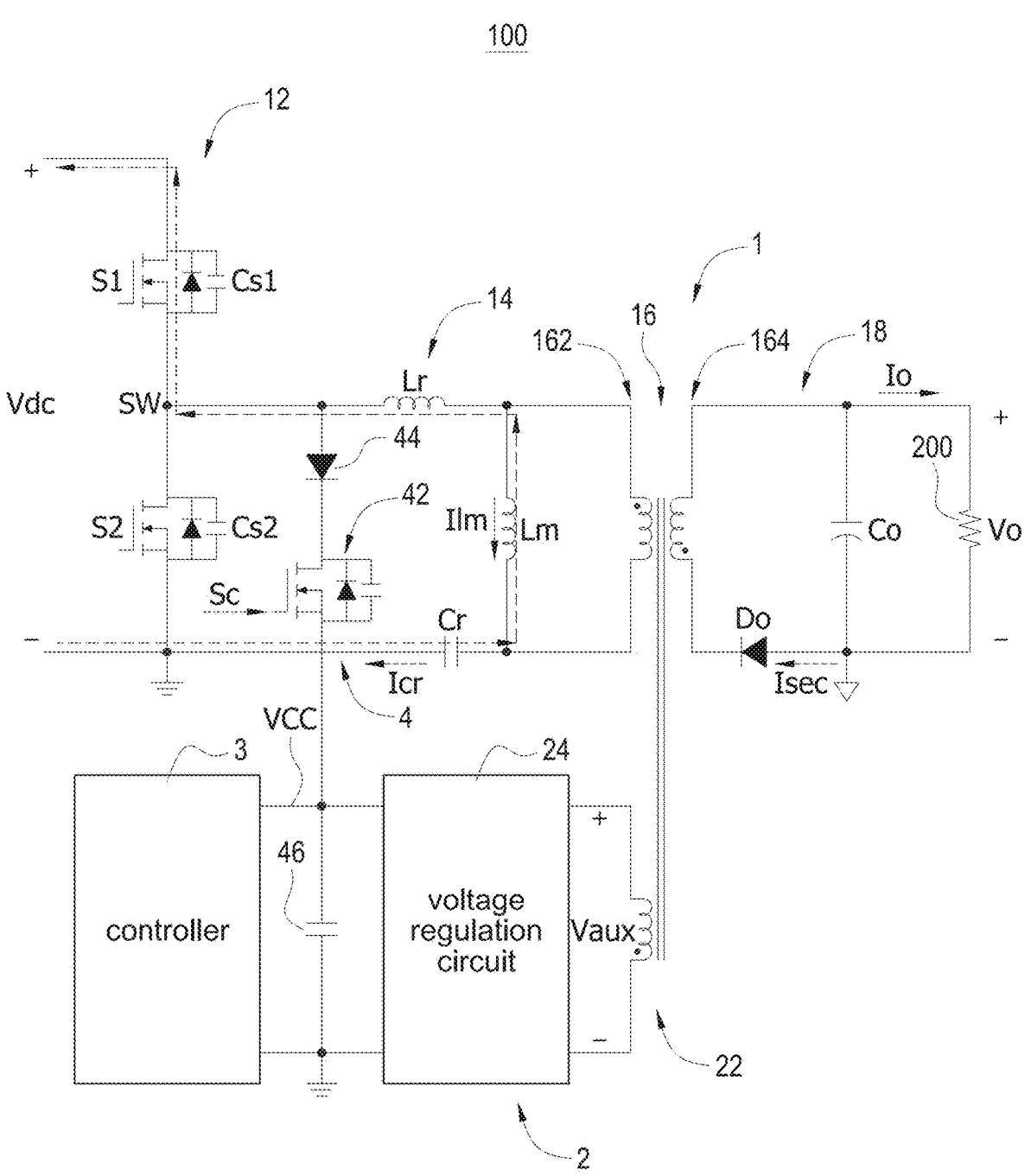

Please refer to FIG. 2, which shows a timing waveform diagram of operating the asymmetric half-bridge flyback power converter in a discontinuous resonant mode according to the present disclosure; please refer to FIG. 3A to FIG. 3G, which show respectively current path diagrams of operating the asymmetric half-bridge flyback power converter in the discontinuous resonant mode according to the present disclosure, and also refer to FIG. 1A to FIG. 1B. During time t1 to time t2 (refer to FIG. 3A), the controller 3 controls the first switch S1 to be turned on, and controls the second switch S2 and the discharging switch 42 to be turned off so that the output diode Do and the diode 44 are reverse biased and cut off. In this condition, the DC voltage Vdc charges the magnetizing inductance Lm, and the magnetizing inductance Lm stores the magnetizing current Ilm. Until the current value of the magnetizing current Ilm rises to greater than or equal to the current threshold, the controller 3 controls the first switch S1 to be turned off to enter the time t2 to time t3 (i.e., dead time). During time t2 to time t3 (refer to FIG. 3B), the controller 3 controls the first switch S1, the second switch S2, and the discharging switch 42 to be turned off, and the output diode Do and the diode 44 are reverse biased and cut off. In this condition, the magnetizing current Ilm causes the second parasitic capacitance Cs2 of the second switch S2 to discharge toward the node SW, and after a junction diode of the second switch S2 is forward biased and turned on, the dead time is ended and the controller 3 controls the second switch S2 to be turned on to enter the time t3 to time t4.

During time t3 to time t4 (refer to FIG. 3C), the controller 3 controls the second switch S2 to be turned on, and controls the first switch S1 and the discharge switch 42 to be turned off. In this condition, the output diode Do is forward biased and turned on, and the diode 44 is reverse biased and cut off. Furthermore, the energy of the primary-side winding 162 is transferred to the secondary-side winding 164 and the auxiliary winding 22 to provide the remaining energy to the output capacitor Co and the controller 3 to maintain the normal operation of the power converter 100. During time t4 to time t5 (refer to FIG. 3D), the controller 3 controls the first switch S1, the second switch S2, and the discharging switch 42 to be turned off so that the output diode Do and the diode 44 are reverse biased and cut off and the magnetizing current Ilm is released to 0 A.

During time t5 to time t6 (refer to FIG. 3E), the controller 3 continuously controls the first switch S1, the second switch S2, and the discharging switch 42 to be turned off, and the output diode Do and the diode 44 are continuously reverse biased and cut off. In this condition, the magnetizing inductance Lm, the first parasitic capacitance Cs1, and the second parasitic capacitance Cs2 generate resonance with a resonant period (that is, the current flows back and forth through the magnetizing inductance Lm, the first parasitic capacitance Cs1, and the second parasitic capacitance Cs2), and the resonant period is related to a magnitude of the output current Io of the power converter 100. In general, when the output current Io is larger, the resonant period is shorter, and vice versa. After a sufficient number of cycles of resonance occurs and the resonant current Icr resonates to 0 A, the controller 3 controls the discharge switch 42 to be turned on to enter the time t6 to time t7.

During time t6 and time t7 (refer to FIG. 3F), the controller 3 controls the discharging switch 42 to be turned on so that the diode 44 is forward biased and turned on. Similarly, the controller 3 continuously controls the first switch S1 and the second switch S2 to continuously be turned off, and the output diode Do is continuously reverse biased and cut off. In this condition, the resonant capacitor Cr simultaneously charges the second parasitic capacitance Cs2 of the second switch S2, the energy storage capacitor 46, and the magnetizing inductance Lm. Since the capacitance value of the energy storage capacitor 46 will be much larger than the second parasitic capacitance Cs2 of the second switch S2, most of the charging current will flow to the energy storage capacitor 46 so that the second parasitic capacitance Cs2 of the second switch S2 will not be fully charged immediately. Therefore, during the charging process, the magnetizing inductance Lm is charged with a large enough reverse current, and the direction of this current is opposite to the direction of the magnetizing current Ilm and flows through the node SW to the second parasitic capacitance Cs2 to charge the second parasitic capacitor Cs2.

When a sufficiently large reverse current Isw is reached (that is, when the current Isw flowing in the direction of the node SW increases to a second current threshold −Ith), the controller controls the discharging switch 42 to be turned off to enter the time t7 and time t8. During time t7 and time t8 (refer to FIG. 3G), the controller 3 controls the first switch S1, the second switch S2, and the discharging switch 42 to be turned off, and the output diode Do and the diode 44 are reverse biased and cut off. In this condition, the reverse current Isw that is opposite to the magnetizing current Ilm discharges the first parasitic capacitance Cs1 of the first switch S1 so that a junction diode of the first switch S1 is forward biased and turned on so as to achieve the effect of zero-voltage switching.

In particular, the above "large enough" means a current that is enough to completely charge the second parasitic capacitance Cs2 of the second switch S2 and completely discharge the first parasitic capacitance Cs1 of the first switch S1. Therefore, the capacitance value of the first parasitic capacitance Cs1 and the capacitance value of the second parasitic capacitance Cs2 may preferably be smaller than the energy storage capacitance of the energy storage capacitor 46, and the second current threshold −Ith is related to the time when the discharge of the first parasitic capacitance Cs1 is completed. When the capacitance value of the first parasitic capacitance Cs1 and the capacitance value of the second parasitic capacitance Cs2 are larger, the second current threshold −Ith may be increased (referring to the higher its absolute value), and vice versa, and its formula is as follows:

$$\sqrt{\frac{(Cs1 + Cs2) \times Vdc^2}{Lm}}$$

In particular, −Ilm is the current setting value opposite to the magnetizing current Ilm (i.e., the second current threshold −Ith), and its setting value may be set by the controller 3.

Figure 4:
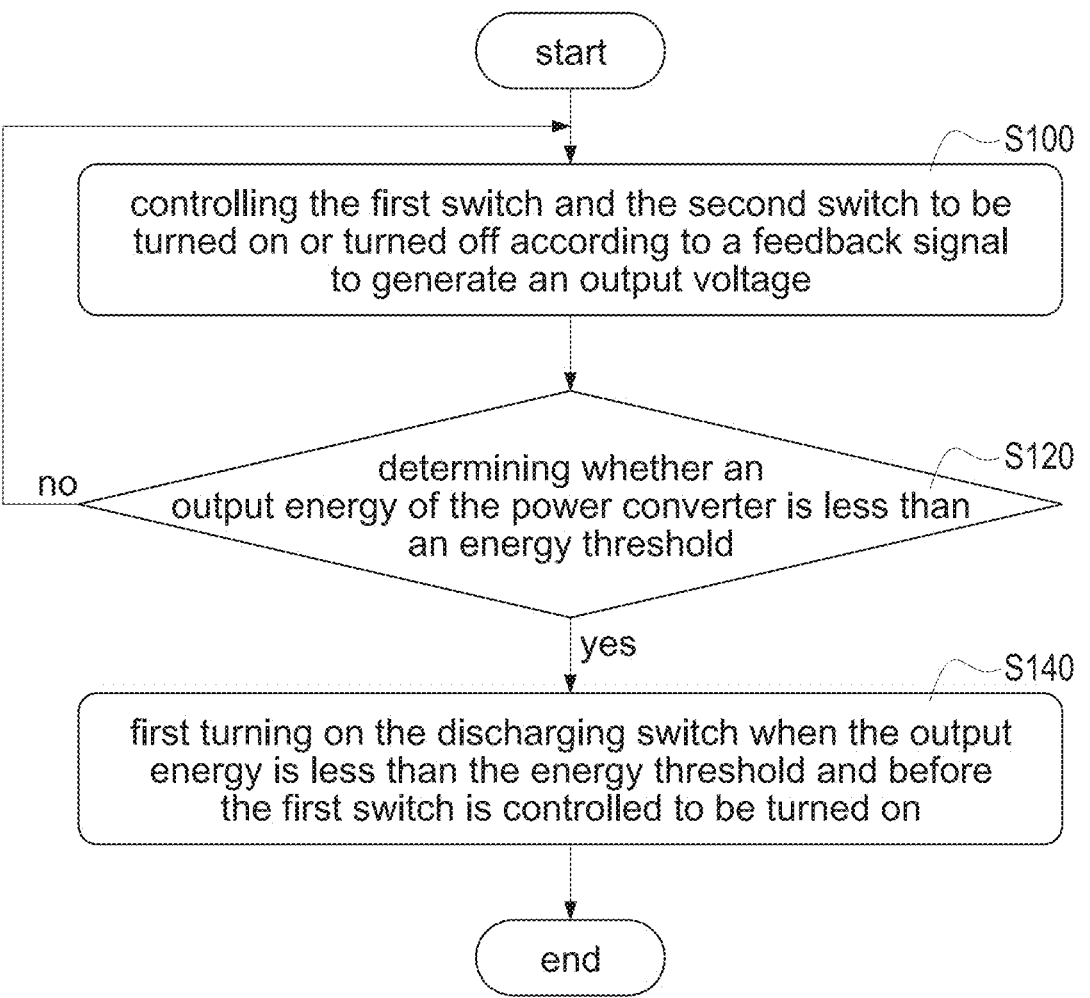
FIG. 4 is a flowchart of a method of operating the asymmetric half-bridge flyback power converter according to the present disclosure.

Please refer to FIG. 4, which shows a flowchart of a method of operating the asymmetric half-bridge flyback power converter according to the present disclosure, and also refer to FIG. 1 to FIG. 3G. The power converter 100 includes a transformer 16, a resonant circuit 14, a first switch S1, a second switch S2, a discharging switch 42, and an energy storage capacitor 46. The first switch S1 and the second switch S2 are connected in series at a node SW, and the resonant circuit 14 is coupled between the node SW and the transformer 16. The discharging switch 42 is coupled between the node SW and the energy storage capacitor 46. The first switch S1, the second switch S2, and the discharging switch 42 are controlled by the controller 3. The method of operating the power converter 100 includes steps of: controlling the first switch and the second switch to be turned on or turned off according to a feedback signal to generate an output voltage (S100). In one embodiment, a pulse-width modulation (PWM) signal is provided by the controller 3 to control the first switch S1 and the second switch S2 to be turned on or turned off so as to control the power conversion circuit 1 to convert a direct-current (DC) voltage Vdc into an output voltage Vo. Moreover, the controller 3 receives the feedback signal corresponding to the output voltage Vo, and adjusts the PWM signal according to the feedback signal so as to stabilize/regulate a voltage value of the output voltage Vo by adjusting the PWM signal.

Afterward, determining whether an output energy of the power converter is less than an energy threshold (S120). Due to changes in the output wide voltage and output current Io (herein collectively referred to as output energy), when the output energy changes, the flux leakage time will change.

Therefore, it is necessary to determine whether the power converter 100 is operating in the continuous resonant mode or the discontinuous resonant mode by whether the output energy is lower than the threshold so as to provide corresponding operation steps according to the different modes. When the determination result in step (S120) is yes, it means that the output energy is lower than an energy threshold and the power converter 100 operates in the discontinuous resonant mode. Therefore, first turning on the discharging switch when the output energy is less than the energy threshold and before the first switch is controlled to be turned on (S140). The resonant circuit 14 can be used to reversely charge the magnetizing inductance Lm to increase the reverse current flowing into the node SW between the first switch S1 and the second switch S2, and use this reverse current to discharge the parasitic capacitance of the first switch S1 to achieve the effect of zero-voltage switching.

When the determination result in step (S120) is no, it means that the output energy is greater than the energy threshold and the power converter 100 operates in the continuous resonant mode. Therefore, return to step (S100) for continued determination. In one embodiment, the operating steps not detailed in FIG. 4 may be referred to FIG. 1 to FIG. 3G and will not be repeated here. In addition, in an embodiment of the present disclosure, the control of the first switch S1, the second switch S2, and the discharging switch 42 is not limited to being controlled only by the controller 3. All controllers, control circuits (composed of passive electronic components), logic circuits (composed of logic components) and other devices that can perform the above operations should be included in the scope of this embodiment.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An asymmetric half-bridge flyback power converter comprising:

a transformer comprising a primary-side winding, a secondary-side winding, and a magnetizing inductance; the primary-side winding coupled to the secondary-side winding, and the magnetizing inductance connected to the primary-side winding in parallel, a resonant circuit coupled to the primary-side winding, a switching circuit comprising a first switch and a second switch connected in series at a node, and the node coupled to the resonant circuit, a zero-voltage switching circuit coupled to the node, and comprising a discharging switch, a diode, and an energy storage capacitor connected in series, and a controller coupled to the zero-voltage switching circuit, and the controller configured to control the first switch and the second switch to be turned on or turned off to generate an output voltage, wherein when an output energy of the power converter is less than an energy threshold and before the first switch is turned on by the controller, the controller is configured to first turn on the discharging switch so that the energy storage capacitor stores energy to rise a current flowing to the node.

2. The asymmetric half-bridge flyback power converter as claimed in claim 1, wherein when the output energy is the output voltage and the output voltage is less than an a voltage threshold, the controller is configured to first turn on the discharging switch before the first switch is turned on by the controller; when the output energy is an output current of the power converter and the output current is less than a first current threshold, the controller is configured to first turn on the discharging switch before the first switch is turned on by the controller.

3. The asymmetric half-bridge flyback power converter as claimed in claim 1, further comprising:

an auxiliary winding coupled to the primary-side winding, and a voltage regulation circuit coupled to the auxiliary winding, wherein the auxiliary winding is coupled to the primary-side winding to generate a winding voltage, and the voltage regulation circuit is configured to supply power to the controller according to the winding voltage.

4. The asymmetric half-bridge flyback power converter as claimed in claim 3, wherein the energy storage capacitor is connected to the voltage regulation circuit in parallel, and the energy storage capacitor is configured to store a working voltage provided by the voltage regulation circuit, and the controller is configured to receive the working voltage to operate.

5. The asymmetric half-bridge flyback power converter as claimed in claim 4, wherein the first switch comprises a first parasitic capacitance, and a capacitance value of the first parasitic capacitance is less than an energy storage capacitance value of the energy storage capacitor.

6. The asymmetric half-bridge flyback power converter as claimed in claim 5, wherein when the first switch is turned on and the second switch is turned off, the magnetizing inductance stores energy of a magnetizing current, wherein when a current value of the magnetizing current is greater than or equal to a current threshold, the controller is configured to turn off the first switch so that a second parasitic capacitance of the second switch discharges toward the node.

7. The asymmetric half-bridge flyback power converter as claimed in claim 6, wherein when the first switch is turned off and the second switch is turned on, the energy of the primary-side winding is transferred to the secondary-side winding and the auxiliary winding, wherein when the first switch and the second switch are turned off and the magnetizing current releases energy to zero, the magnetizing inductance, the first parasitic capacitance, and the second parasitic capacitance generate a resonance with a resonant period.

8. The asymmetric half-bridge flyback power converter as claimed in claim 7, wherein the resonant period is related to a magnitude of an output current of the power converter.

9. The asymmetric half-bridge flyback power converter as claimed in claim 7, wherein the resonant circuit comprises a resonant capacitor; when the discharging switch is turned on, the resonant capacitor charges the second parasitic capacitance, the energy storage capacitor, and the magnetizing inductance.

10. The asymmetric half-bridge flyback power converter as claimed in claim 9, wherein when the current rises to a second current threshold, the controller is configured to turn off the discharging switch, and the second current threshold is related to a time when the first parasitic capacitance is completely discharged.

11. A method of operating an asymmetric half-bridge flyback power converter, the power converter comprising a transformer, a resonant circuit, a first switch, a second switch, a discharging switch, and an energy storage capacitor; the first switch and the second switch connected in series at a node, and the resonant circuit coupled between the node and the transformer; the discharging switch coupled between the node and the energy storage capacitor; the method comprising steps of:

controlling the first switch and the second switch to be turned on or turned off according to a feedback signal to generate an output voltage, determining whether an output energy of the power converter is less than an energy threshold, and first turning on the discharging switch when the output energy is less than the energy threshold and before the first switch is controlled to be turned on.

12. The method of operating the asymmetric half-bridge flyback power converter as claimed in claim 11, wherein when the output energy is the output voltage, further comprising steps of:

determining whether the output voltage is less than a voltage threshold, and first turning on the discharging switch when the output voltage is less than the voltage threshold and before the first switch is controlled to be turned on.

13. The method of operating the asymmetric half-bridge flyback power converter as claimed in claim 11, wherein when the output energy is an output current of the power converter, further comprising steps of:

determining whether the output current is less than a first current threshold, and first turning on the discharging switch when the output current is less than the first current threshold and before the first switch is controlled to be turned on.

14. The method of operating the asymmetric half-bridge flyback power converter as claimed in claim 11, further comprising steps of:

storing energy of a magnetizing current of the transformer when the first switch is turned on and the second switch is turned off, turning off the first switch when a current value of the magnetizing current is greater than or equal to a current threshold, and discharging a second parasitic capacitance of the second switch toward the node.

15. The method of operating the asymmetric half-bridge flyback power converter as claimed in claim 14, further comprising steps of:

transferring the energy of the transformer to a secondary-side winding and an auxiliary winding of the power converter, and generating a resonance with a resonant period by the magnetizing inductance, a first parasitic capacitance of the first switch, and the second parasitic capacitance of the second switch when the first switch and the second switch are turned off and the magnetizing current releases energy to zero, wherein the resonant period is related to a magnitude of an output current of the power converter.

16. The method of operating the asymmetric half-bridge flyback power converter as claimed in claim 15, further comprising steps of:

charging the second parasitic capacitance, the energy storage capacitor, and the magnetizing inductance by a resonant capacitor of the resonant circuit, and turning off the discharging switch when the current rises to a second current threshold, wherein the second current threshold is related to a time when the first parasitic capacitance is completely discharged.

* * * * *